Sept. 2, 1969  D. A. KELLY  3,464,395

MULTIPLE PISTON VANE ROTARY INTERNAL COMBUSTION ENGINE

Filed Nov. 27, 1967  3 Sheets-Sheet 1

INVENTOR.
Donald A. Kelly
BY
Carl Miller
ATTORNEY

Sept. 2, 1969                     D. A. KELLY                     3,464,395
              MULTIPLE PISTON VANE ROTARY INTERNAL COMBUSTION ENGINE
Filed Nov. 27, 1967                                      3 Sheets-Sheet 2
FIG. 4
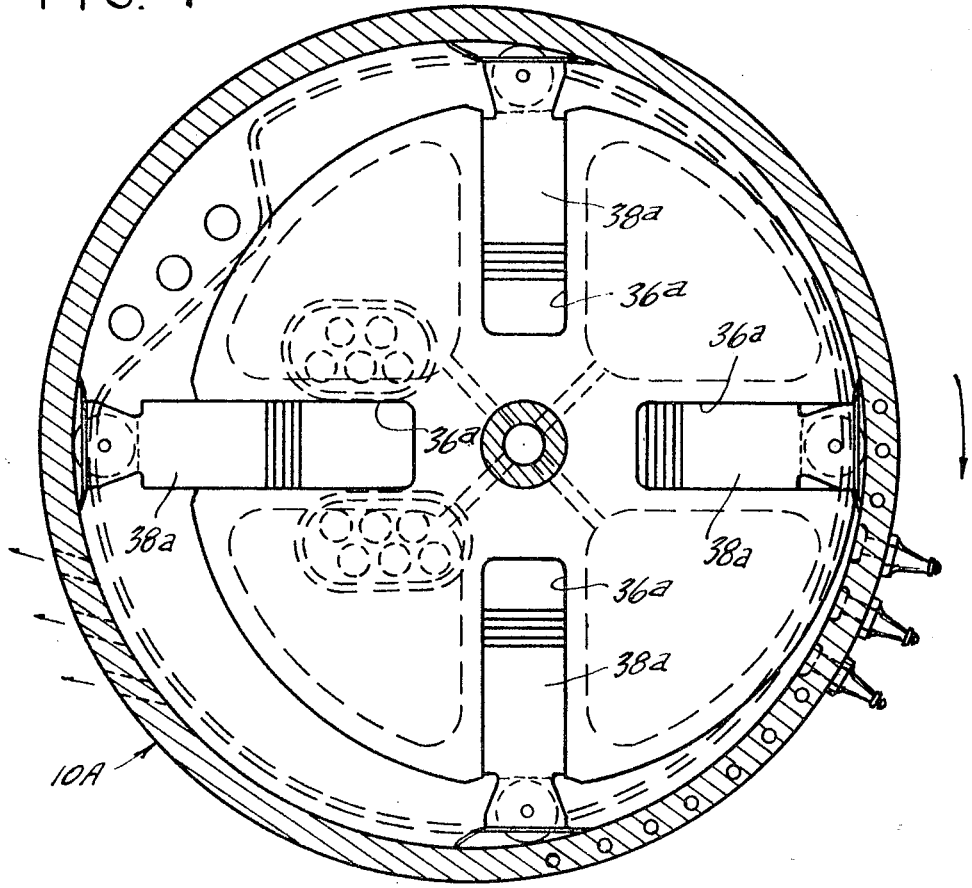
FIG. 3
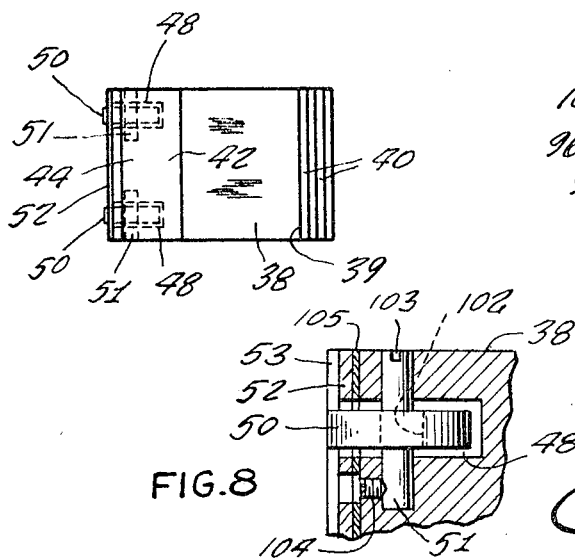
FIG. 7
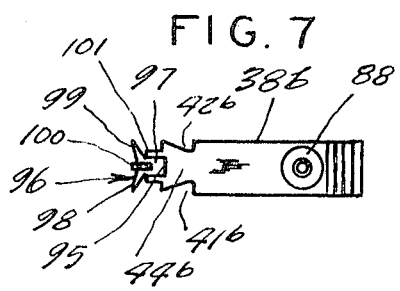
FIG. 8
INVENTOR.
Donald A. Kelly
BY
Carl Miller
ATTORNEY INVENTOR.
Donald A. Kelly
BY Carl Miller
ATTORNEY 3,464,395
Patented Sept. 2, 1969

3,464,395
MULTIPLE PISTON VANE ROTARY INTERNAL COMBUSTION ENGINE
Donald A. Kelly, 58—06 69th Place, Maspeth, N.Y. 11378
Filed Nov. 27, 1967, Ser. No. 685,792
Int. Cl. F02b 55/02, 55/10; F04b 1/10
U.S. Cl. 123—16                 10 Claims

ABSTRACT OF THE DISCLOSURE

An internal combustion engine having a cylindrical casing with end closure plates and an eccentric rotor fitted therein secured to a drive shaft supported by bearing on the end closure plates. The rotor carries a plurality of angularly spaced radial piston vanes reciprocating each in an associated radial slot. Ball bearing mounted rollers either on the outer ends of the piston vanes rolling on the inside cylindrical wall of the cylinder casing or at the opposite end sides of the piston vanes and rolling in annular grooves in the end closure plates operate to impart the reciprocatory movement to the piston vanes as the rotor rotates. The chambers formed between the projecting portions of the piston vanes, cylinder wall and end closure plates form intake, compression, combustion and exhaust chambers. Similar chambers are formed between the inner ends of the piston vanes, the bottom wall of the slots and the end closure plates. Both types of chambers, from intake to exhaust, treat the gaseous fuel to effect a combined internal combustion engine of the rotary and reciprocating types. A cooling system is provided to cool by means of pressurized flow of a liquid coolant both the end closure plates and the interior of the rotor. Appropriate sealing members both metallic and non-metallic at the outer ends of the piston vanes serve to establish a complete seal against the flow of gases past the same.

---

This invention relates to a combined rotary and reciprocating internal combustion engine and has for its primary object to combine the high efficiency of a rotary type engine and the moderate torque at low speeds of a radial piston engine all for balanced high speed and low speed torque performance.

Another object of this invention is to provide in a rotary engine having a cylinder with opposed end closure plates and an eccentric rotor therein with power vanes reciprocating in slots in the rotor and in which the power vanes also function as radial pistons.

A further object of this invention is to provide the piston vanes with guiding rollers mounted on ball bearings and tracking either on the inside cylindrical wall surface of the engine cylinder or at the end sides of the piston vanes to track in annular grooves provided in the cylinder end closure plates.

A still further object of this invention is to provide a unique seal between the outer terminal end of the piston vanes and the inside cylindrical wall surface of the cylinder including metal sealing members having flexible lips secured to the terminal end along with a non-metallic sealing strip carried thereby and disposed between the flexible lips, the seal further contemplating using one or the other separately.

Yet another object of this invention is to provide a cooling system that will supply a coolant under pressure to the cylinder wall, to jackets on the end closure plates and to cavities within the rotor.

Another object of the invention is to achieve additional torque at lower speeds by converting the radial thrusts of the piston type vanes.

It is an object of the invention to produce a basically simple rotary internal combustion engine with a minimum of friction in operating parts by the application of ball bearing rollers carried on the piston vanes.

It is an object of the invention to produce a piston vane type rotary engine which is relatively inexpensive to manufacture by utilizing simple geometric shapes and low cost components.

It is an object of the invention to produce a simple rotary engine which achieves nearly complete combustion within the combustion cavities in order to greatly reduce the noxious and toxic levels of the exhaust gases.

It is an object of the invention to produce a simple rotary engine with a minimum number of operating parts for ease of production, replacement and maintenance.

Further objects of the invention will appear as the description proceeds.

To the accomplishment of the above and related objects, my invention may be embodied in the form illustrated in the accompanying drawings attention being called to the fact, however, that the drawings are illustrative only, and that change may be made in the specific construction illustrated and described within the scope of the appended claims.

FIGURE 3 is a side view of a piston vane as employed in the engine of FIGURE 1.

FIGURE 4 is a top sectional view similar to FIGURE 1 of a modified form of engine employing wide piston vanes.

FIGURE 7 is a side view of a piston vane as employed in the engine of FIGURE 3 showing a modified form of cylinder bore seal.

FIGURE 8 is a detail sectional view of a modification of the piston vane of FIGURE 1 showing a clearance adjustment for the rollers on the piston vane.

Figure 1:
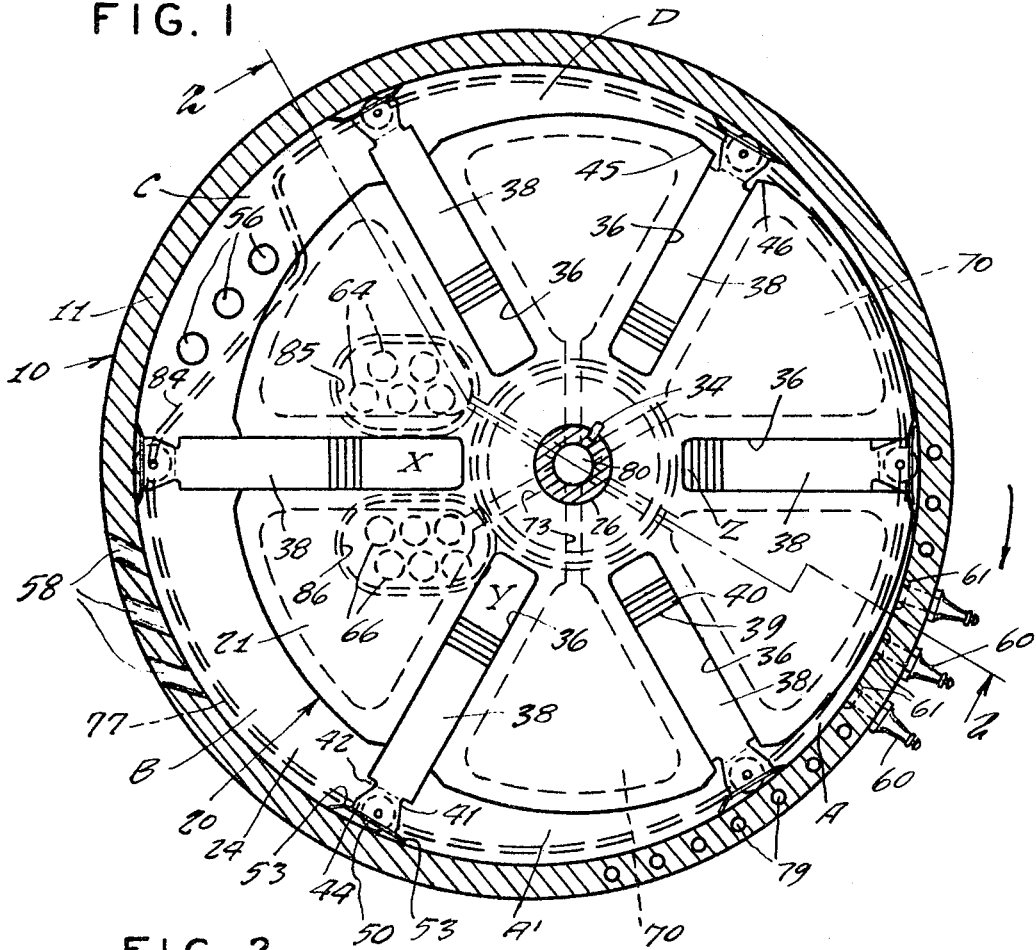
FIGURE 1 is a top sectional view of the piston vane rotary engine.
Figure 2:
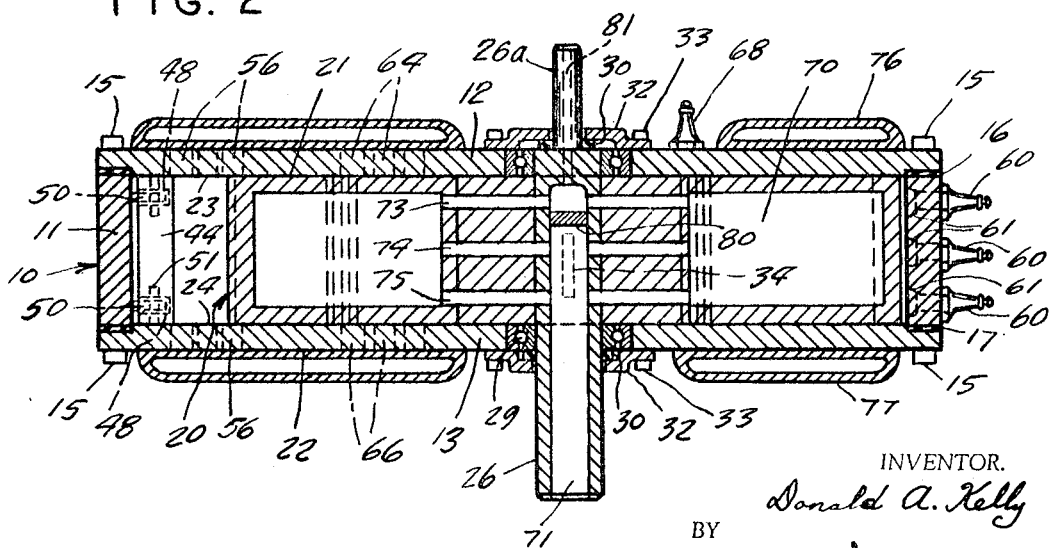
FIGURE 2 is an elevational sectional view of the engine taken on line 2—2, FIGURE 1.

Referring now in more detail to the accompanying drawings and first considering FIGURES 1, 2 and 3, it will be seen that the engine casing 10 consists of a cylinder 11 disposed with its axis vertical and upper and lower end closure plates 12 and 13 respectively, which are removably secured to cylinder 11 by cap bolts 15. The suitable annular gaskets 16, 17 are provided between the closure plates 12, 13 and the adjacent side walls of the cylinder 11 to effect a positive complete seal therebetween. The cylinder 11 is provided with suitable brackets, legs or base supports (not shown) for attaching the engine casing 10 to a supporting surface.

Operating within the cylinder 11 is a rotor 20 of a cylindrical form and of a predetermined diameter substantially less than the inside diameter of the cylinder 11. The vertical height of rotor 20 is such that the upper and lower faces 21, 22 thereof will have a machined sliding engagement with the inside surfaces 23, 24 respectively, of closure plates 12, 13. Both the rotor faces 21, 22 and the inside surfaces 23, 24 of the closure plates are provided with a machine finish of RMS 16 or better. In order to minimize friction, the rotor faces 21, 22 may be provided with a thin coating of Teflon or other suitable anti-friction material. Extending axially of the rotor 20 is a drive shaft 26 suitably mounted and supported in the anti-friction rolling bearings (ball or roller) 28, 29 fitted respectively in the closure plates 12, 13. A sealing ring 30 surrounds each shaft adjacent each bearing, both the bearing and shaft seal being held in place by a retainer cap 32 detachably secured to an associated closure plate by cap screws 33. The shaft seals 30 act to prevent dirt and grit from entering the engine at these points. A key 34 secures the drive shaft 26 to the rotor 20, axially as well as against relative rotational movement. As seen in FIGURES 1 and 2, the axis of rotation of rotor 20 is eccentric with relation to the axis of cylinder 11 providing a substantially crescent shaped chamber therewithin defining a combustion cavity or chamber A–A', exhaust cavity or chamber B, intake cavity or chamber C, and compression cavity or chamber D as will be hereinafter described in greater detail.

The rotor 20 is provided with six identical radial rectilinear slots 36 spaced 60 degrees apart and with their bottom ends equally spaced from the rotor axis. The slots 36 are each the full height of the rotor 20 and extend to the cylindrical surface thereof. Operating within each slot 36 is a reciprocating piston vane 38 having a width corresponding to the height of the rotor 20, a depth corresponding to the width of the slot 36 and a length corresponding substantially to the length of the slot. Adjacent the inner end of each piston vane there is provided a number of perimetral rectangular grooves 39 in which are seated sealing elements 40 functioning in the manner of piston rings. The outer end of each piston vane 38 is recessed at its opposed lateral sides as at 41, 42 to provide a bearing and seal support 44. The piston vane 38 thus has on its lateral sides between its inner end and the shoulders formed by recesses 41, 42 sliding surface contact with the walls of slot 30 while its end sides have sliding surface contact with the inner sides 23, 24 respectively of closure plates 12, 13 to thereby constitute therewith a piston reciprocating in a cylinder. It is to be noted that the end sides of the bearing and seal support 44 are coextentive with the end sides of the piston vane proper and also have the same sliding engagement with the inner sides 23, 24 of closure plates. The recesses 41, 42 facilitate the projection and retraction of the piston vane 38 in its associated slot 36. The outer ends of each slot 36 are beveled or flared outwardly as at 45, 46 for a purpose to be hereinafter described.

Provided in the bearing and seal support 44 are a pair of laterally and symmetrically spaced slots 48, see FIGURES 2 and 3. Within each slot 48 is a roller 50 having a ball bearing mounting (not shown) on a fixed shaft 51. The rollers 50 on the piston vanes 36 each have rolling contact on the inside cylindrical surface of cylinder 11, at all times, irrespective of the position of the piston vanes in the rotor as determined by the rotor. To insure a positive gas tight seal between the outer terminal end of the bearing and seal support 44 at each side thereof and the inside wall of cylinder 11 there is provided a thin flexible metal flap seal 52 of beryllium or bronze that is bonded or otherwise suitably secured thereto. The seal 52 is formed with tapered flexible flap or lip extensions 53 that overhang the lateral sides of support 44 in the direction of the circumferential extent of the inside wall of cylinder 11 to slidably contact the same. The beveled or outwardly flared ends 45, 46 of each slot provide space to accomodate the seal 52 and its tapered lips 53 when the piston vane 38 is fully retracted.

In the sector defining the intake chamber C there is provided multiple intake ports 56 which are placed in either or both of the closure plates 12, 13 and parallel to the cylinder axis. Multiple exhaust ports 58 are provided in the wall of cylinder 11 in the sector defining the exhaust chamber B which are sloped to provide a smooth substantial tangential flow from the forming exhaust chamber B. Tangential flow is desirable to obtain a complete scavenging action of the exhaust gases for efficient operation of the engine. Additional intake ports may be tangentially located in the cylinder 11 for some applications where primary and supercharging may be desirable. The air-gas mixture enters from the intake ports 56 axially into intake chamber C for fuel consumption efficiency and convenience. As seen in FIG. 1, both the intake ports 56 and exhaust ports 58 are located opposite the dead center position of the rotor 20 (where piston vane 38 is fully retracted) and are substantially symmetrically positioned at about 60 degrees apart. They are relatively closely located to each other to obtain maximum angular working chambers (D and A–A') for the compression and power cycles for each engine revolution.

Provided in the cylinder wall approximately 10 to 15 degrees off dead center in the direction of rotor rotation are the multiple spark plugs 60 with the points thereof located in combustion pockets 61 formed interiorly of the cylinder wall, see FIGS. 1 and 2. This angular offset provides thrust direction for the burning gases on the piston vanes 38 during the six power pulses per revolution of the rotor. Rotor inertia further insures thrust direction during the power cycles. The purpose of the multiple plugs is to give complete uniform gas combustion over the firing area and insure ignition back-up in case one or more of the plugs misfires or failure occurs in the high tension line from the coil and distributor (not shown). The plug terminal pockets 61 provide isolation for the spark plug points from the rotor vanes and are of a shape to aid the thrust direction of the burning expanding gases in the combustion chamber A–A'.

As described above each piston vane 38 operating in its associated rotor slot 36 between closure plates 12, 13 provides a cylinder and reciprocating piston arrangement corresponding to a conventional piston, cylinder internal combustion engine. Accordingly there is provided in either or both of the closure plates 12, 13 at the same angular position as intake ports 56, additional multiple intake ports 64 located, as seen in FIG. 1, at the start of the intake phase of the piston vane 38 and rotor cavity X which lies in a sector zone radially inwardly of the intake ports 56. Exhaust ports 66 provided in either or both of the closure plates 12, 13 are located at the start of the exhaust phase of the piston vane 38 and rotor cavity Y which lies in the sector zone radially inwardly of exhaust ports 58 and have the same angular position. Closure plate 12 is provided with one or more spark plugs 68 at the same angular position as spark plugs 60 and directly over the compression phase of the piston vane 38 and rotor cavity Z with the terminal points of the spark plugs positioned in combustion pockets (not shown) corresponding to combustion pockets 61. The combustion pockets for the spark plugs 60 and 68 aid in swirling the fuel-air mixture during the combustion phase.

The distributor system (not shown) would cause all the spark plugs 60 and 68 to fire simultaneously at each compressed chamber (A) and rotor cavity (Z) position. For the six piston vane engine shown there would be six firing positions. It is contemplated that the distributor would be driven from the top shaft extension 26a of the drive shaft 26 and that the distributor cam be phased with the rotor 20 so that ignition occurs when the center of the compressed chamber (A) and rotor cavity (Z) are coincident with the mean angular spark plugs position.

A fuel injection system (not shown) of any suitable type may be employed with the engine or a standard internal combustion engine carburetor (not shown) may be employed if required by specific application requirements.

The exhaust ports 58, 66 may be fitted with a powered blower arrangement (not shown) to increase the overall engine operating efficiency and to reduce noxious combustion products. The blower system would be normally applied when a supercharger is used, with both arrangements being optional based on the specific application.

A starter motor and drive arrangement (not shown) may be connected to the lower end of drive shaft 26. Also an alternator (not shown) may be belt connected to a pulley on the drive shaft 26.

Most of the accessory units applicable to internal combustion reciprocating engines would also be applicable to the herein described piston vane rotary engine and are not shown nor described since they are standard stock items. Some of the extra performance devices and auxiliaries which are applicable to conventional internal combustion engines may be applied to the instant rotary engine design, since their operation is generally compatible.

In order to cool the rotary engine there is formed within the rotor body 20 between each of the slots 36 therein a hollow cavity 70 of a generally triangular form with the apex adjacent to the rotor axis. The drive shaft is provided with a bore 71. Radial sets of passages 72, 73, 74, there being three such for each set and vertically aligned, see FIG. 2, connect the bore 71 with the apex end of each cooling cavity 70. A substantially annular water jacket 76, 77 is attached to the exterior face respectively of closure plates 12, 13 suitably connected by intake and outlet conduits (not shown) to a source of pressurized coolant liquid supply. The cylinder 11 is cooled by the provision of passages or bores 79 that are circumferentially spaced entirely around the cylinder wall and extend transversely completely therethrough in parallel relation. The passages 79 communicate at each end with the intake and outlet conduits (not shown) connected to the jackets 76, 77. Leakage is prevented by the gaskets 16 that include openings registering with the passages 79. Within bore 71 and just below passages 73 is a fixed partition 80, and provided in the upper drive shaft extension 26a is a bore 81. Water or other coolant liquid is supplied to inlet bore 81 and flows through passages 73 into the rotor cavities 70, circulating therein and out through passages 74, 75 to be discharged through outlet bore 71. Each water jacket 76, 77 is formed adjacent its outer periphery with a recess 84 to accommodate the intake ports 56, see FIG. 1, and with a pair of suitably formed openings 85, 86 adjacent its inner periphery to accommodate the rotor cavity intake and exhaust ports 64, 66 respectively. Likewise a suitable recess is provided at the inner periphery of the water jackets 76, 77 to accommodate the spark plugs 68 carried by the closure plates.

The basic design of the combined rotary and reciprocating engine 10 as shown in FIGURES 1 and 2 lends itself to ready adaption in tandem arrangement to boost power output. The two engines may operate with independent compression ratios, or the compressed air-gas mixture of one may be fed into the second engine to boost its final compression ratio. The choice of methods should be based on the specific application requirements. The adding of compression ratios would be more suitable for lower speed, higher torque applications.

Figure 6:
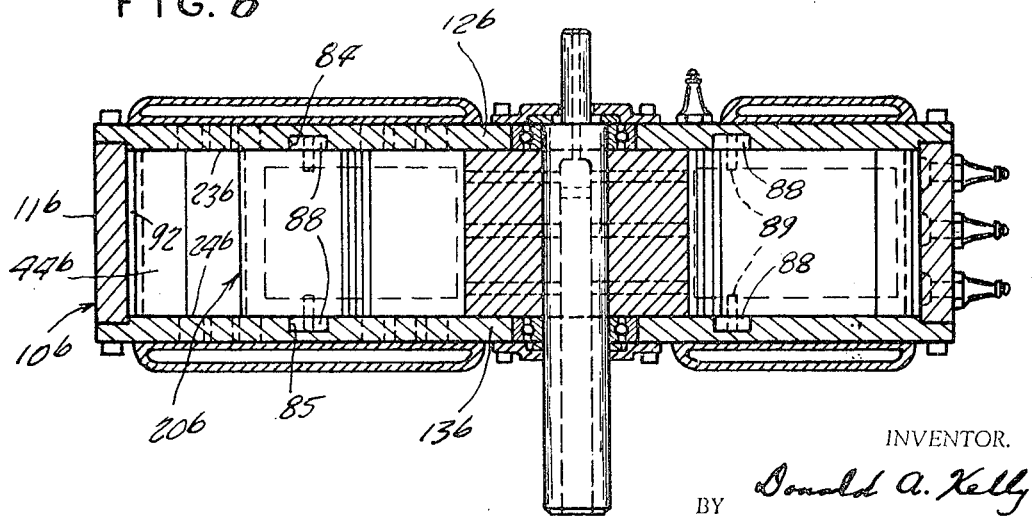
FIGURE 6 is an elevational sectional view of the engine of FIGURE 3 taken on line 6—6 thereof.

The modified combined rotary and reciprocating engine 10A shown in FIG. 4 is essentially the same as that of FIGS. 1, 2 and 6 described in detail above and distinguishes therefrom in that it employs four piston vanes 38a disposed 45 degrees apart with their associated rotor slots 36a considerably wider than the rotor slots 36 and the piston vanes 38a correspondingly wider.

Figure 5:
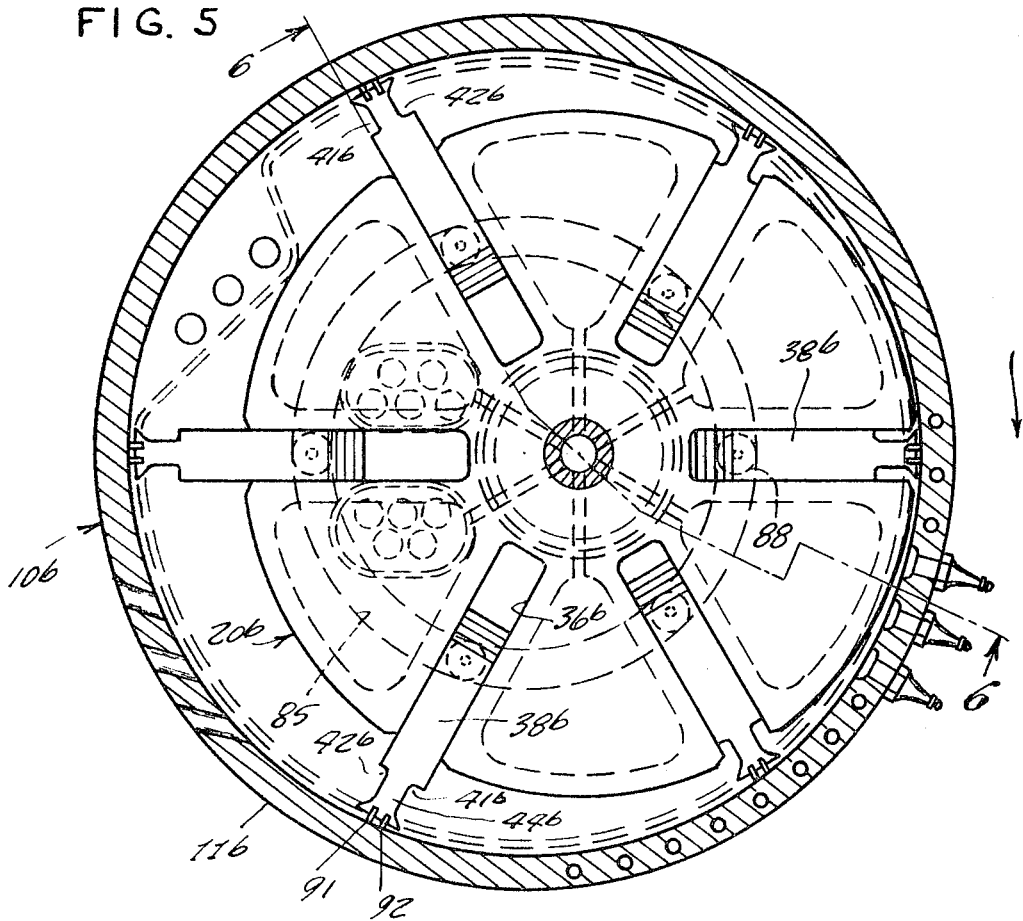
FIGURE 5 is a top sectional view of the engine similar to FIGURE 1 but illustrating a modified form of piston vane guidance arrangement.

In the engine 10b modification of FIGS. 5, 6 and 7 there is employed a different guidance arrangement for the piston vanes as well as a different piston vane seal construction, the engine as to its cylinder and rotor construction and cooling system being the same as that shown in the engine of FIGS. 1 and 2.

Formed in the inner sides 23b, 24b of the closure plates 12b, 13b are respectively, axially opposed annular grooves 84, 85. Each of the piston vanes 38b, see FIGS. 6 and 7, is provided on each of the end sides thereof with a roller 88 of a diameter slightly less than the thickness of the piston vane. Each roller 88 is supported by ball bearings (not shown) on a fixed shaft 89 mounted on the piston vane 38b inwardly of the sealing elements 40b. Thus, in the assembled relation of the engine parts the pair of rollers 88 of each piston vane will fit into a groove 85 which provides a guide track for the roller moving therein. The axially aligned grooves or guide tracks 85 are located with their axis substantially coinciding with the axis of cylinder 11b and the axis of rotor 20b is thus eccentric to the axis of the annular grooves or guide tracks 84, 85. This arrangement will accordingly impart a reciprocatory movement to the piston vanes 38b as the rotor 20b rotates and insure that the outer ends of the piston vanes 38b will clear the inside cylindrical surface of cylinder 11b by from .005 to .010 inch.

The outer terminal end portion of each piston vane 38b is recessed at its lateral faces as at 41b, 42b in the same manner and for the same purpose as set forth above with regards to the recesses 41, 42 in piston vanes 38 (FIG. 1). Suitably secured in the free terminal end of the bearing and seal support 44b (formed by the recesses 41b, 42b) are a pair of spaced sealing members having the free edges thereof in sliding sealing contact with the inside cylindrical wall surface of cylinder 11b for the entire height thereof. The sealing members may be of Teflon or a metal such as beryllium or bronze.

In lieu of the dual spaced sealing members 91, 92 the free end of bearing and seal support 44b, see FIG. 7 is cut out to define a rectangular recess 95 imparting a somewhat Y configuration to the support 44b. A Y-shaped insert sealing member 96 having a leg portion 97 complemental in shape to recess 95 for seating engagement therein is formed of metal such as beryllium or bronze. Extending laterally from leg portion 97 are opposed tapering flaps or lips 98, 99 that are flexible, and have sliding sealing contact with the inside cylindrical surface of cylinder 11b. An additional sealing strip 100 of Teflon or other suitable material is inserted in a slot 101 centrally provided in leg portion 97 and is suitably secured therein, the sealing strip 100 (which is similar to sealing members 91, 92) also slidably contacts the inside cylindrical surface of cylinder 11b. The combined Y-shaped sealing member 96 with flaps or lips 98, 99 and sealing strip 11 provides a highly efficient seal between the terminal end of the piston vane 38b and the inside wall surface of cylinder 11b, that is strong and durable, will resist wear and will provide a positive seal against the escape of gases past the piston vane. Due to the Y configuration of the insert sealing member 96, the same will also provide an additional baffling effect for the piston vanes, and the sealing strip 100 aid in baffling and in forming a turbulent flow at the ends of the piston vanes.

In the event that it is desired to provide an adjustment in the piston vane clearance between the end of the piston vane (in its full retracted position at dead center) and the inside cylindrical wall surface of the cylinder, the intermediate portion 102 of each of the shafts 51 supporting roller 50 may be formed eccentric to the axis of the shaft, see FIG. 8 and the shaft 51 provided at its exposed end with a screw driver slot 103 to facilitate turning thereof. This will move the roller 51 towards or away from the cylinder wall to adjust the clearance. The shaft 51 may be locked in adjusted position by a set screw 104. A similar construction may be employed with the rollers 88 on the piston vane 38b, FIGS. 5, 6 and 7.

The clearance of the flap seal 52 may be adjusted by the placement of a shim or shims 105 between the seal 52 and the terminal end of the piston vane 38, and the shim securely bonded in place.

Having described by invention, what I claim as new and desire to secure by Letters Patent is:

1. A rotary and reciprocatory internal combustion engine comprising:
   (a) a cylinder member open at each end,
   (b) a circular closure plate detachably secured to each cylinder member end and forming with said cylinder member an engine cylinder,
   (c) a rotor having parallel end faces within said cylinder with each face thereof having sliding contact with the inside face of an adjacent closure plate, (d) an axial drive shaft secured to said rotor and extending through both said closure plates, (e) bearing members including sealing means on each closure plate rotatably supporting said drive shaft eccentric to the axis of the engine cylinder, (f) a plurality of radial slots in said rotor each slot having a bottom and said slots being equally spaced apart, (g) an imperforate piston vane having parallel lateral and end sides positioned in each slot for reciprocatory movement therein and having a width corresponding to the axial length of said rotor whereby the end sides of said piston vane will be co-planar with the end faces of the rotor, (h) a plurality of individual spaced roller guide means separately mounted on an exterior portion of each piston vane and each tracking on a fixed part of said engine cylinder to effect reciprocation of the piston vane on rotation of the rotor, (i) sealing means carried by the free terminal end of each piston vane slidably contacting the inside wall surface of said cylinder member, (j) said rotor end faces, the end sides of each piston vane and the sealing means carried thereby having a combined sliding sealing engagement with the inner surfaces of the engine cylinder, whereby there is provided between adjacent piston vanes on the rotor and the inside surface of the closed cylinder member a plurality of substantially circumferential chambers each varying in volume as the rotor rotates, and between the inner terminal end of each piston vane and the bottom of its associated slot a plurality of separate radial chambers each varying in volume as the piston vane reciprocates, each radial chamber being effectively sealed with relation to the formed circumferential chambers adjacent thereto and both the circumferential and radial chambers constituting separate power combustion and exhaust chambers for a combustible gas mixture for respectively simultaneously driving said piston vanes both rotatively and radially.

2. The internal combustion engine of claim 1, wherein:
(a) with one piston vane completely retracted in dead center position, the remaining piston vanes define therebetween an intake chamber, a compression chamber a combustion chamber and an exhaust chamber,
(b) at least one intake port in one closure plate located in the zone of the intake chamber for the flow of a fuel mixture thereinto,
(c) at least one exhaust port in the cylinder member located in the zone of the exhaust chamber for the out-flow of the exhaust gas mixture therefrom, and
(d) at least one spark plug carried by the cylinder member in the zone of the combustion chamber adjacent to the dead center piston vane position and forwardly therefrom in the direction of rotor rotation.

3. The internal combustion engine of claim 2, wherein:
(a) said intake port is located adjacent to said cylinder member wall with the axis thereof directed parallel to the cylinder member axis, and
(b) said exhaust port axis is substantially tangent to the rotor periphery, and
(c) a combustion pocket in the inner wall surface of said cylinder member for receiving therein the electrodes of said spark plug.

4. The internal combustion engine of claim 3, including:
(a) at least one second intake port in one closure plate located forwardly in the direction of rotor rotation of the piston vane in fully projected position to supply a fuel mixture to the chamber in the slot containing said piston vane as the rotor and piston vane move thereacross, and (b) at least one second exhaust port in one closure plate located rearwardly of the piston vane in fully projected position to discharge the exhaust gas in the chamber of the slot containing the piston vane immediately adjacent to and preceding said first mentioned piston vane in the direction of rotor rotation as the rotor and said last mentioned piston vane move thereacross,
(c) at least one spark plug carried by one closure plate located adjacent to the bottom of the slot containing the piston vane that is fully retracted and slightly forwardly thereof in the direction of rotor rotation, and
(d) a combustion pocket in the inner face of said closure plate receiving the electrodes of said last mentioned spark plug.

5. The internal combustion engine of claim 4, including:
(a) a liquid coolant jacket detachably secure exteriorly to each closure plate and interconnected to receive, circulate and discharge, a pressurized liquid coolant,
(b) a plurality of liquid coolant containing closed cavities formed in said rotor between each pair of adjacent slots,
(c) said drive shaft having an axial bore therethrough,
(d) a partition within said drive shaft dividing said bore into an inlet coolant passage and an outlet coolant passage,
(e) there being a separate opening connecting the inlet coolant passage with each of said rotor cavities, and
(f) at least one separate opening connecting the outlet coolant passage with each of said rotor cavities,
whereby liquid coolant under pressure is caused to flow and circulate through all of said rotor cavities and discharged through said outlet passage as the rotor rotates in operation.

6. The internal combustion engine of claim 1, wherein said roller guide means comprises:
(a) a bearing and seal support at the outer end of each piston vane,
(b) a pair of laterally spaced slots in said support,
(c) a shaft extending through each said slot and both shafts co-axially aligned,
(d) a roller including anti-friction bearings mounted on each shaft,
(e) there being a slight clearance between the outer free terminal end of said support and the inside cylindrical surface of said cylinder member in the fully retracted position of each piston vane in its dead center position, and
(f) said rollers having rolling contact directly on said inside cylindrical surface.

7. The internal combustion engine of claim 6, including:
(a) a metal seal member secured to the outer free terminal end of each said support having opposed flexible lips projecting laterally beyond the side faces of the piston vane and corresponding in length to the width of said side faces,
whereby the edges of said flexible lips will slidably contact the inner cylindrical wall surface of the cylinder member to establish a positive seal between the piston vane end and the said cylinder wall.

8. The internal combustion engine of claim 7, including:
(a) eccentric means on each said shaft,
(b) said roller and its anti-friction bearing being supported on said eccentric means,
(c) means on said shaft for turning the same to adjust said clearance, and
(d) means on said support for locking said shaft in adjusted position.

9. The internal combustion engine of claim 7, wherein said roller guide means comprises:
(a) an annular rectangular groove in the inside surface of each closure plate concentric with the cylinder axis,
(b) said annular grooves bring in opposed relation and axially aligned,
(c) a pair of rollers each including an anti-friction bearing for each piston vane, (d) fixed shaft means mounting each roller of the pair on an end side of a piston vane with the shaft means co-axial,
(e) said pair of rollers of each piston vane being positioned in each groove in rolling contacting engagement with the walls of said grooves
whereby on rotation of said rotor said rollers operating in said grooves will effect a reciprocatory movement of the piston vanes in their associated slots, and
(f) a pair of flexible sealing members mounted on the outer terminal end of each piston vane for sliding sealing engagement with the inside wall surface of said cylindrical member, 10. The internal combustion engine of claim 9, wherein:
(a) one said sealing member is a Y-shaped metal insert having,
  (1) a leg portion, and
  (2) a pair of diverging tapered flexible lips
(b) a recess in the outer terminal end of the piston vane,
(c) said leg portion being complemental to said recess for fitted seated secured engagement therein,
(d) said flexible lips each having along their edges sliding contacting sealing engagement with said inside cylindrical wall surface, and
(e) the other sealing member being a flexible non-metallic strip secured to said leg portion of said one sealing member between the lips thereof whereby the free edge of said strip will have sliding contacting sealing engagement with said inside cylindrical wall surface.

References Cited

UNITED STATES PATENTS

| | | | |
|---|---|---|---|
| 2,688,924 | 9/1954 | Links. | |
| 3,181,512 | 5/1965 | Hapeman | 123—16 |
| 3,301,232 | 1/1967 | Eickmann | 123—16 |
| 3,352,291 | 11/1967 | Brown | 123—16 |
| 3,398,725 | 8/1968 | Null | 123—16 |

FOREIGN PATENTS 149,600  8/1920  Great Britain.

CORNELIUS J. HUSAR, Primary Examiner

U.S. Cl. X.R.

103—161